Jan. 13, 1970 F. W. KELLEY, JR., ET AL 3,489,927
MEANS FOR SUPPRESSING TIME RATE OF CHANGE OF VOLTAGE
IN SEMICONDUCTOR SWITCHING APPLICATIONS
Filed Aug. 23, 1967
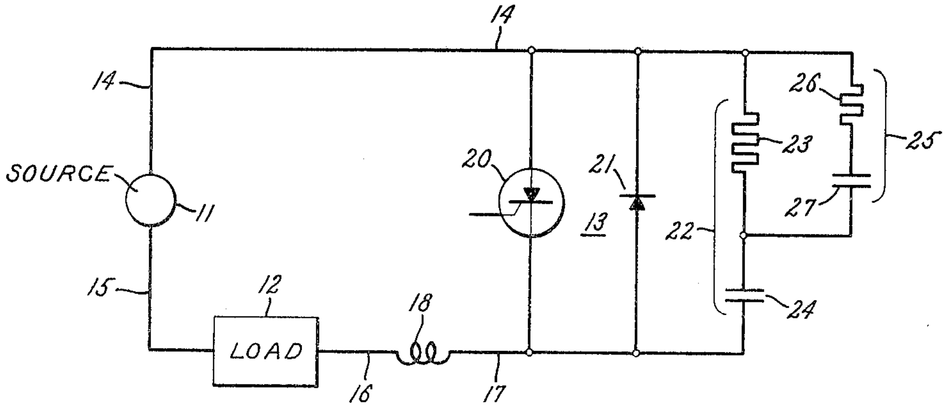
INVENTORS:
FRED W. KELLEY, JR.,
ISTVAN SOMOS,
BY Albert S. Richardson Jr.
ATTORNEY United States Patent Office 3,489,927

Patented Jan. 13, 1970

3,489,927
MEANS FOR SUPPRESSING TIME RATE OF CHANGE OF VOLTAGE IN SEMICONDUCTOR SWITCHING APPLICATIONS

Fred W. Kelley, Jr., Media, and Istvan Somos, Lansdowne, Pa., assignors to General Electric Company, a corporation of New York Filed Aug. 23, 1967, Ser. No. 662,642
Int. Cl. H03k *17/56*
U.S. Cl. 307—252 7 Claims

ABSTRACT OF THE DISCLOSURE

In order to protect a bidirectionally conducting semiconductor switch from excessive *dv/dt,* the switch is shunted by a main resistance-capacitance circuit the resistive portion of which is shunted in turn by an auxiliary resistance-capacitance circuit having a much shorter time constant.

Our invention relates generally to electric current switching circuits of the kind employing semiconductor devices to govern the flow of electric power between a source and a load. Such circuits are commonly used in apparatus known as inverters which convert electric power from direct (D-C) to alternating (A-C) form. Of course they are useful in other settings as well.

The heart of the switching circuit is the semiconductor device which typically comprises a thin, broad area disc-like body of multilayer semiconductor material (such as silicon) separating a pair of load current conducting electrodes (anode and cathode). A simple 2-layer device, wherein there is a single PN (rectifying) junction between the electrodes, has uncontrolled current rectifying ability and is generally known as a diode. Where a degree of control over the rectifying process is needed, more sophisticated 4-layer devices known as thyristors are commonly used. A unidirectionally conducting device of the latter type, popularly referred to as a silicon controlled rectifier or SCR, has three back-to-back PN junctions between its anode and cathode and is additionally provided with appropriate means for initiating conduction between these electrodes on receipt of a predetermined control signal.

When its anode and cathode are externally connected in series with an electric power load and a source of forward anode voltage (i.e., anode potential is positive with respect to cathode), an SCR will ordinarily block appreciable current flow in the power circuit until triggered or "fired" by the application thereto of a control signal (gate pulse) above a small threshold value, whereupon it abruptly switches from a high-resistance to a very low-resistance, forward conducting (turned on) state. Subsequently the device reverts to its non-conducting (turned off) state in response to the magnitude of through current being reduced below a given holding level. If a bidirectionally conducting switch is desired, the foregoing device can be paralleled by a duplicate SCR or by a diode which is inversely poled with respect thereto.

For a more complete understanding of the operating theory of thyristors, see chapter 2, pp. 63–131 of Semiconductor Controlled Rectifiers, written by F. E. Gentry et al. and published in 1964 by Prentice-Hall, Inc., Englewood Cliffs, N.J. As is explained in Section 2.6.2, pp. 113–17 of that book, *dv/dt* triggering is another recognized mechanism by which an SCR can be turned on.

In certain inverter applications, an SCR can be subjected to a very high time rate of rise of forward anode voltage (v.) at the conclusion of an interval of switch conduction. If the *dv/dt* withstand ability of the SCR were exceeded by the duty imposed thereon, the device would prematurely refire and the inverter mechanism would fail. To avoid this possibility, it is customary in such applications to shunt the SCR with a *dv/dt* suppression circuit comprising a capacitor and a resistor in series. The suppression circuit is commonly known as a snubber.

The snubber is designed to limit the maximum rate of change of voltage across the SCR whenever a stepped forward voltage is applied thereto. The snubber capacitor and resistor should be coordinated with the external power circuit inductance to provide a slightly underdamped series RLC circuit that will ensure a relatively gradual rise of forward SCR voltage toward its steady state blocking level with a controlled amount of overshoot. Consequently the initial *dv/dt* is close to the maximum *dv/dt* experienced during the anode voltage transient.

A number of interrelated and sometimes competing factors affect the choice of values of snubber resistance (R ohms) and capacitance (C farads). Of course the configuration and key parameters of the particular power circuit in which the SCR is to be used are primary factors, as are the *dv/dt, di/dt* and peak forward voltage capabilities of available SCR's. Since the steepness of the initial *dv/dt* imposed on the SCR is directly related to the value of R that is selected, this value cannot be excessively high. On the other hand, the amount of anode voltage overshoot will vary inversely with R, and for this reason R should be as high as possible. Damping can be further enhanced by increasing C, but electric power losses (due to the cyclic storage and dissipation of electrostatic energy in the snubber) are determined by the value of the latter quantity which consequently dictates the selection of an appropriately low C.

In some applications, *dv/dt* protection for SCR's cannot be economically obtained with snubbers known heretofore. We have found that the aforementioned trade-offs among *dv/dt* suppression, damping, and efficiency are particularly disadvantageous when prior art snubbers are required to protect an SCR that is connected in parallel with an inversely poled rectifying element, such as a bypass diode, to form a bidirectionally conducting switch. In this setting the reapplication of forward voltage on the turned off SCR is delayed until the parallel element stops conducting, at which time an unexpectedly high *dv/dt* is experienced. We have discovered that this observed phenomenon can be attributed to the superposition of the diode recovery current that is briefly switched into the snubber as the diode assumes reverse voltage. Accordingly, an objective of the present invention is to provide a practical solution to the identified problem.

In carrying out our invention in one form, we shunt the bidirectionally conducting switching means with an improved *dv/dt* suppression circuit that is formed by a main resistance-capacitance circuit, comprising a first resistor and a first capacitor serially connected across the switching means, and an auxiliary resistance-capacitance circuit, comprising a second resistor in series with a second capacitor, connected in parallel with the first resistor and in series with the first capacitor. We make the resistance of the auxiliary circuit as much lower than the resistance of the first resistor as is necessary to produce a net paralleled resistance that will limit the initial *dv/dt* thereacross as desired. We then select a capacitance value that makes the time constant of the auxiliary circuit a small fraction (i.e., less than one-half) of the time constant of the main circuit. As a result, the net snubber resistance temporarily is low during the early part of the anode voltage transient and then is relatively high during the remainder of the transient when the damping factor is more important.

Our invention will be better understood and its various objects and advantages will be more fully appreciated from the following description taken in conjunction with the accompanying drawing, the single figure of which is a schematic circuit diagram showing in simplified form semiconductor switching means protected by $dv/dt$ suppressing means embodying the invention.

Referring to the drawing, the schematically illustrated circuit is seen to comprise an electric power source 11, an electric power load 12, and bidirectionally conducting semiconductor switching means 13. These components are serially interconnected by power circuit means comprising a plurality of load current conductors 14, 15, 16, and 17 and an industance element 18. A capacitance element (not shown) is often connected in parallel or in series with the load 12. Any person skilled in the art will recognize the combination thus represented as a basic power circuit that is useful in a variety of contexts, such as, for example, a high-frequency (i.e., 400 cycles per second and up) self-commutated inverter. Being both well known in the art and nonessential to an adequate understanding of the present invention, the details of the control means for triggering the switching means 13 and the particulars of the accompanying power components (rectifier, transformer, complementary switching means, etc.) that would be included in a practical end product have been omitted in the drawing.

Preferably the switching means 13 comprises a semiconductor controlled rectifier 20 and a semiconductor diode 21 connected in inverse parallel relationship with each other. The anode of the SCR 20 is shown connected to the load current conductor 14 in common with the cathode of the diode 21, while the cathode of the SCR 20 is connected to the conductor 17 in common with the anode of diode 21.

In order to limit the maximum rate of rise ($dv/dt$) of the forward anode voltage that is applied to the SCR 20 when the diode 21 ceases to conduct, a main resistance-capacitance circuit 22 has been connected across the anode and the cathode of this device. The main circuit 22 comprises a resistor 23 in series with a capacitor 24. These R and C components are coordinated with the effective series inductance (L henries) of the power circuit to form a series RLC circuit that is slightly underdamped. (The magnitude of L is determined by the particular power circuit in which this switch 13 is used. It is established principally by the size of the inductor 18 and in any event is appreciable.)

The following information may be useful in selecting the R and C values for the main circuit 22. Noting that the capacitor 24 is in an essentially discharged state while the switching means 13 is conducting, the highest $dv/dt$ imposed on the SCR 20 at the conclusion of a switch conducting interval will, as a first approximation, be considered equal to $$\frac{di}{dt}R$$

where $di/dt$ is equal to $V/L$, V being the maximum forward anode volts that can be initially applied to the SCR 20. Therefore if R were approximately equal to the rated $dv/dt$ withstandability of the given SCR 20 multiplied by the fraction $L/V$, the initial $dv/dt$ theoretically will not exceed permissible limits.

Having thus determined the value of R, C is selected to minimize so far as possible both electric power losses and anode voltage overshoot. The amount of electric power that the main R-C circuit 32 dissipates, for given values of V and of operating frequency, will vary directly with C, and consequently a relatively low value of this quantity is desired, particularly in high-frequency installations. But for given values of L and R, the amount of overshoot (and hence the rated forward blocking voltage required of the SCR 20) increases as C is decreased, and too low a value is therefore undesirable. The overshoot factor (defined for present purposes as the ratio of peak forward anode voltage to V) is a complex function of the surge impedance ($\sqrt{L/C}$) of the circuit involved. For example, if $\sqrt{L/C}$ were equal to R, an overshoot factor of approximately 1.3 would be obtained; by doubling C this factor could be reduced to approximately 1.2. We prefer at present to choose a maximum tolerable overshoot factor of 1.36 which is obtained by selecting the value of C that results in $\sqrt{L/C}$ being approximately equal to 1.25R.

In practice the $dv/dt$ actually measured across the SCR 20 when the diode 21 stops conducting can be substantially greater than the quantity $VR/L$ used in the earlier calculation. Apparently the reverse recovery current of the diode switches to the main circuit 22 where it transiently adds to the surge of current supplied by the external power circuit. We have found that the decay time constant of this superimposed "clean-out" current is typically in the order of 1 microsecond which is only a small fraction of the total anode voltage transient time.

In order to eliminate the excessive $dv/dt$, we shunt the resistor 23 of the main circuit 22 with an auxiliary resistance-capacitance circuit 25. The auxiliary circuit 25 comprises a resistor 26 and a capactor 27 connected in series with each other to form a parallel combination with the resistor 23. The resistance value of the auxiliary circuit 25 is made lower than the resistance value of 23, and the capacitance value of the auxiliary circuit is so selected that the time constant thereof is a small fraction (i.e., less than one-half) of the time constant of the main circuit 22. Consequently, for an early portion of the anode voltage transient the net resistance of the parallel combination that is in series with the first capacitor 24 will be substantially lower than R, and the initially high $dv/dt$ is suppressed as desired. During the remainder of the transient, when it is important to damp oscillations and thereby limit adverse voltage overshoot, the effective resistance automatically increases to R.

In one successful embodiment of our invention, the resistor 26 of the auxiliary circuit 25 was selected to have a resistance value of approximately ½R, and the additional capacitor 27 was selected to have a capacitance value of approximately ¼C. The losses associated with the additional capacitor are relatively trivial.

Those skilled in the art will recognize the need for sufficient resistance in the $dv/dt$ suppression circuit to limit, within the given $di/dt$ rating of the SCR 20, the surge of current contributed to the SCR by the discharge of capacitor 24 at the beginning of a conducting interval when the switching means is triggered to its low-resistance forward conducting state. In this respect our invention is advantageous because the parallel auxiliary circuit 25 which effects an initially low resistance in series with the capacitor 24 will attain its relatively high impedance state before the capacitor discharge transient has time to reach a dangerously high level.

While we have shown and described a preferred form of the invention by way of illustration, many modifications will occur to those skilled in the art. For example, a triac might be used in lieu of the SCR 20 and diode 21 combination. We therefore contemplate by the claims which conclude this specification to cover all such modifications as fall within the true spirit and scope of the invention.

What we claim as new and desire to secure by Letters Paten of the United States is:

1. In combination, switching means comprising a semiconductor device having a pair of load current conducting electrodes separated by a body of multilayer semiconductor material, and $dv/dt$ suppressing means connected to said electrodes in parallel with said device, said suppressing means comprising:

(a) a main resistance-capacitance circuit comprising a first resistor and a first capacitor serially connected across said electrodes, and (b) an auxiliary resistance-capacitance circuit comprising a second resistor in series with a second capacitor, said auxiliary circuit being connected in parallel with said first resistor and in series with said first capacitor.

2. The combination set forth in claim 1 in which the resistance value of said auxiliary circuit is lower than the resistance value of said main circuit and the capacitance value of said auxiliary circuit is less than one-half the capacitance value of said main circuit.

3. The combination set forth in claim 1 in which said switching means comprises the semiconductor controlled rectifier and a semiconductor diode connected in inverse parallel relationship with each other.

4. Improved means for governing the flow of electric power between a source and a load comprising bidirectionally conducting switching means in combination with power circuit means for interconnecting said switching means, said source and said load, said power circuit means including appreciable series inductance, wherein the improvement comprises shunting said switching means with a *dv/dt* suppression circuit comprising:

(a) an auxiliary circuit including a resistor and a capacitor connected in series with each other, (b) another resistor connected in parallel with said auxiliary circuit, (c) another capacitor, and (d) means for connecting across said switching means said last-mentioned capacitor in series with the parallel combination of said other resistor and said auxiliary circuit.

5. The means set forth in claim 4 in which the resistance value of said auxiliary circuit is lower than the resistance value of said other resistor and the time constant of said auxiliary circuit is a small fraction of that of the remainder of said suppression circuit.

6. The means set forth in claim 5 in which said switching means comprises a thyristor and a diode disposed in inverse parallel relationship with each other.

7. The means set forth in claim 4 in which said switching means comprises a thyristor and a diode disposed in inverse parallel relationship with each other.

References Cited

UNITED STATES PATENTS

| | | |
|---|---|---|
| 3,158,799 | 11/1964 | Kelley. |
| 3,267,290 | 8/1966 | Diebold. |

JOHN S. HEYMAN, Primary Examiner

J. D. FREW, Assistant Examiner

U.S. Cl. X.R.

307—202, 305; 317—33